(12) United States Patent
Ishii

(10) Patent No.: US 7,224,961 B2
(45) Date of Patent: May 29, 2007

(54) DATA TRANSMISSION-RECEPTION SYSTEM AND DATA TRANSMISSION-RECEPTION METHOD

(75) Inventor: Miruka Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 1035 days.

(21) Appl. No.: 09/995,970

(22) Filed: Nov. 28, 2001

(65) Prior Publication Data
US 2002/0132612 A1 Sep. 19, 2002

(30) Foreign Application Priority Data
Nov. 29, 2000 (JP) .............................. 2000-363574

(51) Int. Cl.
H04L 12/58 (2006.01)
H04M 1/725 (2006.01)
H04Q 7/22 (2006.01)

(52) U.S. Cl. .............................. 455/412.1; 455/414.4; 379/67.1; 379/88.1; 379/88.16; 379/88.23

(58) Field of Classification Search ............. 455/412.1, 455/412.2, 414.4, 418–419, 422.1, 435.1, 455/550.1; 379/88.13, 88.14, 100.04, 100.08, 379/100.09, 67.1, 68, 87
See application file for complete search history.

(56) References Cited

U.S. PATENT DOCUMENTS

| | | | | |
|---|---|---|---|---|
| RE34,976 E | * | 6/1995 | Helferich et al. .......... 379/88.1 |
| 5,732,216 A | * | 3/1998 | Logan et al. ................ 709/203 |
| 5,754,628 A | * | 5/1998 | Bossi et al. .............. 379/88.12 |
| 5,805,671 A | * | 9/1998 | Ohuchi ...................... 379/88.1 |
| 5,870,454 A | * | 2/1999 | Dahlen .................... 379/88.14 |
| 6,330,334 B1 | * | 12/2001 | Ryan .......................... 380/237 |
| 6,529,592 B1 | * | 3/2003 | Khan .................... 379/114.01 |
| 6,751,299 B1 | * | 6/2004 | Brown et al. ............ 379/88.18 |
| 7,130,616 B2 | * | 10/2006 | Janik ....................... 455/412.1 |

* cited by examiner

Primary Examiner—Binh K. Tieu
(74) Attorney, Agent, or Firm—Finnegan, Henderson, Farabow, Garrett & Dunner, L.L.P.

(57) ABSTRACT

Disclosed are data transmission-reception system and data transmission method, in which a communication system includes: a first communication device for transmitting outgoing data including content identification data, transmitting party identification data, receiving party identification data, and date and time data; a second communication device for receiving the outgoing data and for transmitting content data identified by the content identification data to a receiving party identified by the receiving party identification data at a date and time corresponding to the date and time data; and a third communication device for receiving and reproducing the content data transmitted from the second communication device.

38 Claims, 8 Drawing Sheets

FIG. 4

CHOICE OF MUSIC

| OCCASIONS | BIRTHDAY | | WEDDING | | GRADUATION | | ADMISSION TO SCHOOL | |
|---|---|---|---|---|---|---|---|---|
| | TITLES | | TITLES | | TITLES | | TITLES | |
| | A | SAMPLING KEY | D | SAMPLING KEY | G | SAMPLING KEY | J | SAMPLING KEY |
| | B | SAMPLING KEY | E | SAMPLING KEY | H | SAMPLING KEY | K | SAMPLING KEY |
| | C | SAMPLING KEY | F | SAMPLING KEY | I | SAMPLING KEY | L | SAMPLING KEY |

CHOICE OF IMAGES

| OCCASIONS | BIRTHDAY | WEDDING | GRADUATION | ADMISSION TO SCHOOL |
|---|---|---|---|---|
| | TITLES | TITLES | TITLES | TITLES |
| | O | R | U | X |
| | P | S | V | Y |
| | Q | T | W | Z |

SEND

US 7,224,961 B2

DATA TRANSMISSION-RECEPTION SYSTEM AND DATA TRANSMISSION-RECEPTION METHOD

BACKGROUND OF THE INVENTION

The present invention relates to a data transmission-reception system and a data transmission-reception method whereby content data such as greeting messages and advertisements are received at their destination at a date and time designated by a transmitting party.

A conventional data transmission-reception system is typically made up of a first terminal device acting as a transmitting party, a server device to which data are uploaded from the first terminal device, and a second terminal device which accesses the server device to download data transmitted from the first terminal device. The first and second terminals are structured as an ordinary personal computer each and are installed in households or other locations.

Illustratively, suppose that the first terminal device transmits a greeting message for a celebration to the second terminal device. In that case, the transmitting party creates the greeting message on the first terminal device, designates an e-mail address as a destination ID of a receiving party, and uploads the message to the server device. Meanwhile, the second terminal device is operated by a user (i.e., owner) accessing the server device to see if any e-mail addressed to the user has arrived at the server. The e-mail, if found to have arrived, is downloaded from the server device. In this manner, the owner of the second terminal device is able to know whether there is any greeting message addressed to him or her at the server.

When launching an advertising campaign using e-mail, a sponsor designates e-mail addresses of receiving parties before uploading advertisement data from the first terminal device to the server device. The second terminal device, in response to the user's operation, accesses the server device to see whether any advertisement data addressed to the user have arrived at the server. The advertisement data, if found, are downloaded from the server device. In that fashion, the owner of the second terminal device is able to know whether there are any advertisement data addressed to him or her at the server.

One disadvantage of the conventional data transmission-reception system outlined above is that the user is unable to know whether there is any greeting message or advertisement data addressed to him or her unless and until the user accesses the server device from his or her terminal device to verify whether there is any e-mail addressed to him or her at the server. Another disadvantage is that the transmitting party has no way of making sure that the greeting message or advertisement data arrive at the intended destination at a desired date and time.

In the meantime, mobile communication terminal devices such as mobile phones are usually carried by users in their bag or pocket, i.e., in a location close enough for a ring tone of the terminal to be heard by its user. That means greeting messages or advertisement data could be arranged to reach the intended users immediately.

SUMMARY OF THE INVENTION

It is therefore an object of the present invention to overcome the above and other deficiencies of the related art and to provide a data transmission-reception system and a data transmission-reception method for transmitting content data such as greeting messages to their destination at a date and time specified by a transmitting party.

It is another object of the invention to provide a data transmission-reception system and a data transmission-reception method for transmitting advertisement data along with content data to mobile communication terminal devices in order to achieve enhanced advertising effects.

It is a further object of the invention to provide a data transmission-reception system and a data transmission-reception method for allowing the owner of a terminal device reproducing advertisement data to receive a compensation for his or her collaboration in an advertising campaign.

It is an even further object of the invention to provide a server device and terminal devices making up the inventive system as outlined above, along with a data transmission-reception method for use with such devices.

In carrying out the invention and according to a first aspect thereof, there is provided a communication system including: a first communication device for transmitting outgoing data including content identification data, transmitting party identification data, receiving party identification data, and date and time data; a second communication device for receiving the outgoing data and for transmitting content data identified by the content identification data to a receiving party identified by the receiving party identification data at a date and time corresponding to the date and time data; and a third communication device for receiving and reproducing the content data transmitted from the second communication device.

According to a second aspect of the invention, there is provided a communication device including: a receiving element for receiving outgoing data including content identification data, transmitting party identification data, receiving party identification data, and date and time data from a first communication device; a storing element for storing the outgoing data; a transmitting element for transmitting content data identified by the stored content identification data to a second communication device; and a controlling element for exercising control to transmit the content data identified by the content identification data to a receiving party identified by the receiving party identification data in the stored outgoing data at a date and time corresponding to the date and time data.

According to a third aspect of the invention, there is provided a communication device including: a transmitting element for transmitting outgoing data including content identification data, transmitting party identification data, receiving party identification data, and date and time data to another communication device; and a controlling element for causing the transmitting element to transmit the outgoing data to the other communication device in response to an operation of a user.

According to a fourth aspect of the invention, there is provided a mobile phone including: a receiving element for receiving greeting mail and advertisement data; a reproducing element for reproducing the received greeting mail; a transmitting element for transmitting to a server device reception-complete data indicating that the greeting mail and the advertisement data have all been received; and a controlling element for causing the transmitting element to transmit the reception-complete data to the server device when the greeting mail and the advertisement data have all been received.

According to a fifth aspect of the invention, there is provided a communication method including the steps of: causing a first communication device to transmit outgoing data including content identification data, transmitting party identification data, receiving party identification data, and date and time data; causing a second communication device to receive the outgoing data and to transmit content data identified by the content identification data to a receiving party identified by the receiving party identification data at a date and time corresponding to the date and time data; and causing a third communication device to receive and reproduce the content data transmitted from the second communication device.

According to a sixth aspect of the invention, there is provided a communication method including the steps of: receiving outgoing data including content identification data, transmitting party identification data, receiving party identification data, and date and time data from a first communication device; and exercising control to transmit content data identified by the content identification data to a receiving party identified by the receiving party identification data at a date and time corresponding to the date and time data.

According to a seventh aspect of the invention, there is provided a communication method including the steps of: transmitting outgoing data including content identification data, transmitting party identification data, receiving party identification data, and date and time data to another communication device; and exercising control to transmit the outgoing data to the other communication device in response to an operation of a user.

According to an eighth aspect of the invention, there is provided a communication method including the steps of: receiving greeting mail and advertisement data; reproducing the received greeting mail; and transmitting reception-complete data to a server device when the greeting mail and the advertisement data have all been received.

According to a ninth aspect of the invention, there is provided a storage medium for storing a communication method program, the program including the steps of: causing a first communication device to transmit outgoing data including content identification data, transmitting party identification data, receiving party identification data, and date and time data; causing a second communication device to receive the outgoing data and to transmit content data identified by the content identification data to a receiving party identified by the receiving party identification data at a date and time corresponding to the date and time data; and causing a third communication device to receive and reproduce the content data transmitted from the second communication device.

According to a tenth aspect of the invention, there is provided a storage medium for storing a communication method program, the program including the steps of: receiving outgoing data including content identification data, transmitting party identification data, receiving party identification data, and date and time data from a first communication device; and exercising control to transmit content data identified by the content identification data to a receiving party identified by the receiving party identification data of the outgoing data at a date and time corresponding to the date and time data.

According to an eleventh aspect of the invention, there is provided a storage medium for storing a communication method program, the program including the steps of: transmitting outgoing data including content identification data, transmitting party identification data, receiving party identification data, and date and time data to another communication device; and exercising control to transmit the outgoing data to the other communication device in response to an operation of a user.

According to a twelfth aspect of the invention, there is provided a storage medium for storing a communication method program, the program including the steps of: receiving greeting mail and advertisement data; reproducing the received greeting mail; and exercising control to transmit reception-complete data to a server device when the greeting mail and the advertisement data have all been received.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a schematic view of a typical screen allowing the transmitting party of FIG. 3 to select at the website the music data and/or image data to be attached to the greeting message;

DETAILED DESCRIPTION OF THE PREFERRED EMBODIMENTS

Preferred embodiments of the data transmission-reception system according to the invention will now be described with reference to the accompanying drawings. The inventive system involves transmitting a greeting message from a transmitting party's terminal device to a receiving party's mobile phone at a desired date and time.

Figure 1:
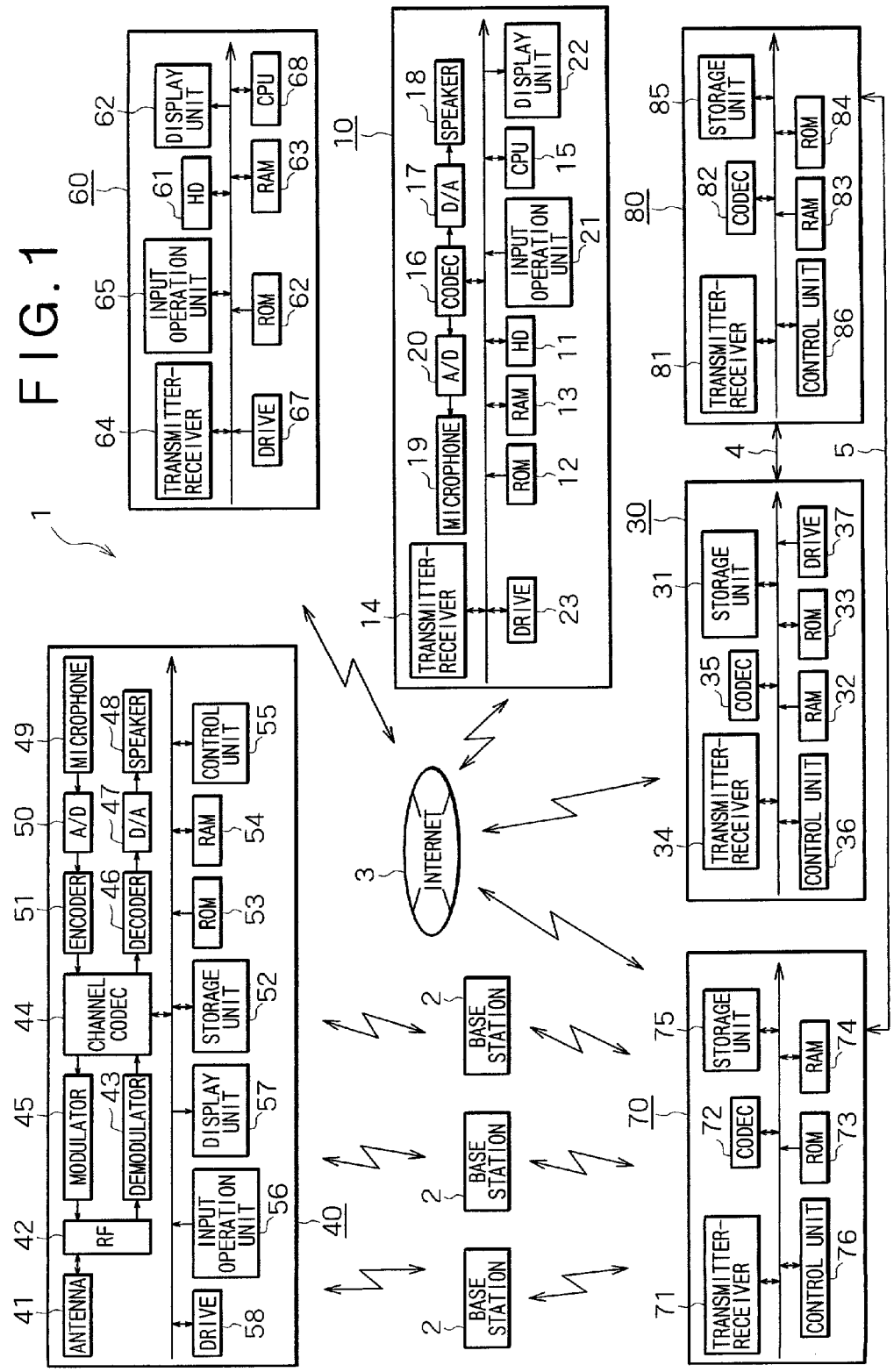
FIG. 1 is a block diagram showing a typical configuration of a data transmission-reception system embodying the invention.

As shown in FIG. 1, the data transmission-reception system 1 includes a transmitting party's terminal device 10 which transmits a greeting message destined for a specific receiving party, a server device 30 which delivers the greeting message from the terminal device 10 to the receiving party at a desired date and time, and a mobile phone 40 which receives the greeting message from the server device 30. The system 1 also includes a sponsor's terminal device 60 that uploads advertisement data to the server device 30. The data transmission-reception system 1 further includes a central management device 70 that provides overall control of a wireless communication network made up of mobile phones 40. Each mobile phone 40 is connected to the central management device 70 via a base station 2. The transmitting party's terminal device 10, sponsor's terminal device 60, and central management device 70 are connected to the server device 30 run by an Internet service provider (i.e., administrator of this system) on the Internet 3 by way of telecommunication lines such as ISDN (Integrated Services Digital Network), CATV (cable television) or optical cable lines. In other words, the mobile phones 40 are connected to the server device 30 via the central management device 70 over the Internet 3.

The data transmission-reception system 1 has a charge server device 80 that settles call charges and other fees associated with the mobile phones 40. The server device 30 is connected to the charge server device 80 by means of a leased line 4, and the central management device 70 is connected to the charge server device 80 by way of a leased line 5.

The transmitting party's terminal device 10 intended to create a greeting message and upload it to the server device 30 is structured substantially as an ordinary personal computer. As such, the transmitting party's terminal device 10 includes a hard disc (HD) 11 that retains greeting messages together with music data to be attached to the greeting messages and also stores various application programs such as a browser for browsing websites established by the server device 30; a read-only memory (ROM) 12 that accommodates control programs for controlling the device as a whole; a random-access memory (RAM) 13 into which programs are loaded from the HD 11 or ROM 12; a transmitter-receiver 14 for exchanging data with the server device 30; and a central processing unit (CPU) 15 that controls the whole device based on the programs loaded into the RAM 13. The transmitting party's terminal device 10 further includes a CODEC 16 that works as a voice data recording-reproducing unit for encoding and decoding voice data; a D/A converter 17 that converts the voice data decoded by the CODEC 16 from digital to analog format; a speaker 18 that outputs the voice data in analog format (i.e., as a voice); a microphone 19 for inputting greeting messages or the like by voice; and an A/D converter 20 that converts the voice data input through the microphone 19 from analog to digital format. In addition, the transmitting party's terminal device 10 has an input operation unit 21 made up of a keyboard, a mouse, a touch panel, etc., through which to make data entries; a display unit 22 constituted illustratively by a liquid crystal display (LCD) panel or a CRT (cathode-ray tube) for displaying website pages or the like downloaded from the server device 30; and a drive 23 that drives an external storage unit accommodating a storage medium such as an optical disc, a magneto-optical disc, a magnetic disc, an IC card, a tape cassette or a disc cartridge.

The transmitting party's terminal device 10 of the above-described constitution allows the user to enter a start command through the input operation unit 21 to start a desired application program from among those stored on the HD 11. In response, the CPU 15 loads the designated program into the RAM 13 from the HD 11 or ROM 12 for execution.

For example, when creating a greeting message in text, the user enters a start command through the input operation unit 21 to start a word processing program. In turn, the CPU 15 loads the word processing program from the HD 11 into the RAM 13 for execution. As the user operates the input operation unit 21, the CPU 15 generates a text such as "BCA (a person's name), congratulations on your 20th birthday" and saves the text data onto the HD 11.

When creating a greeting message by voice, the user may illustratively input by voice an expression such as "Let's have a birthday party on (a specific date)" into the microphone 19. The voice spoken by the user is converted to an analog electrical signal by the microphone 19 before being converted to a digital signal by the A/D converter 20. The digitized voice data are encoded by the CODEC 16 and saved onto the HD 11 by the CPU 15.

The HD 11 retains various pieces of music data. For music data reproduction, the CPU 15 selects a designated piece of music data from the HD 11 and outputs the selected data to the CODEC 16. The selected data are decoded by the CODEC 16 before being converted from digital to analog format by the D/A converter 17 and output from speaker 18.

If the user at the transmitting party's terminal device 10 wants to browse a website set up by the server device 30 for offering this service, the user operates the input operation unit 21 to enter a URL (uniform resource locator) designating the location of the website in question. In turn, the CPU 15 executes the browser program and transmission protocols such as TCP/IP (Transmission Control Protocol/Internet Protocol) to access the server device 30 over the Internet 3, and downloads the desired website pages for display on the display unit 22. Then the user at the transmitting party's terminal device 10 may transmit a greeting message from its transmitter-receiver 14 to the server device 30 over the Internet 3.

Suppose now that the user at the transmitting party's terminal device 10 wants to send a message congratulating a friend on his or her birthday. In that case, the user transmits to the server device 30 three kinds of data: text data such as "BCA (the friend's name), congratulations on your 20th birthday"; voice data that sound like "Let's have a birthday party on (a specific date)"; and music data making up a specific piece of music associated with birthdays such as "Happy Birthday." Obviously the content data to be sent to the server device 30 may optionally consist of text data only, of music data only, of a combination of text data and music data, or of a combination of voice data and music data.

The transmitting party's terminal device 10 transmits such content data to the server device 30 together with a transmitting party ID for identifying the transmitting party, a receiving party ID for identifying the receiving party based on a telephone number or an e-mail address of the mobile phone 40, and date and time data for designating a desired date and time at which the greeting message is to be delivered to the receiving party's mobile phone 40.

The transmitting party's terminal device 10 may have necessary application programs installed by attaching an external storage unit containing the programs to the drive 23 and retrieving them from the attached unit. Alternatively, the application programs may be installed by having them downloaded from appropriate locations through the transmitter-receiver 14.

The server device 30 to which greeting messages are uploaded is structured as an ordinary computer. That is, the server device 30 typically comprises a storage unit 31 that retains websites and application programs; a ROM 32 that stores control programs for controlling overall operations; a RAM 33 into which programs are loaded from the storage unit 31 or ROM 32; a transmitter-receiver 34 for exchanging data with the transmitting party's terminal device 10 and central management device 70; a CODEC 35 that encodes and decodes data; a control unit 36 that controls overall operations based on the programs loaded into the RAM 33 from the storage unit 31 or ROM 32; and a drive 37 to which an external storage unit is attached.

The storage unit 31 is illustratively constituted by a mass storage hard disc that has a database for retaining website pages of this service to be accessed by each transmitting party's terminal device 10, as well as greeting messages, transmitting party IDs, receiving party IDs, and date and time data uploaded from the terminal devices 10. The storage unit 31 also stores advertisement data transmitted from the sponsor's terminal device 60.

When data such as a greeting message are received by the transmitter-receiver 34 from the transmitting party's terminal device 10, the control unit 36 stores the received data into the storage unit 31. Likewise advertisement data received by the transmitter-receiver 34 from the sponsor's terminal device 60 are saved into the storage unit 31.

When a specific date and time indicated by the date and time data in the database of the storage unit 31 are reached, the control unit 36 retrieves the greeting message corresponding to the date and time data from the storage unit 31 and transmits the retrieved message to the mobile phone 40 through the transmitter-receiver 34. At this point, the control unit 36 transmits along with the greeting message the advertisement data received from the sponsor's terminal device 60 to the mobile phone 40 through the transmitter-receiver 34.

The server device 30 may have necessary application programs installed by attaching an external storage unit containing the programs to the drive 37 and retrieving them from the attached unit. Alternatively, the application programs may be installed by having them downloaded from appropriate locations through the transmitter-receiver 34.

The mobile phone 40 that receives greeting messages from the server device 30 comprises an antenna 41 for exchanging data with a base station 2; an RF unit 42 that amplifies data to be exchanged; a demodulator 43 that demodulates data illustratively having undergone QPSK (quadrature frequency shift keying); a channel CODEC 44 that decodes voice data, music data and text data out of those channel-coded illustratively by TDMA (time division multiple access) and encodes outgoing data by the same method; and a modulator 45 that subjects the outgoing data to QPSK or like method for modulation.

The mobile phone 40 also includes a decoder 46 that decodes by ADPCM (adaptive differential pulse code modulation) or similar method the voice data extracted by the channel CODEC 44; a D/A converter 47 that converts the voice data decoded by the decoder 46 from digital to analog format; a speaker 48 that outputs voice data in analog format; a microphone 49 that converts voice into an electrical signal; an A/D converter 50 that converts voice data from analog to digital format; and an encoder 51 that encodes the digitized voice data by ADPCM or the like.

The mobile phone 40 further comprises a storage unit 52 made up of a semiconductor memory such as a flash memory that retains greeting messages, music data and advertisement data downloaded from the server device 30; a ROM 53 that stores control programs or the like for controlling overall operations; a RAM 54 into which data are loaded from the storage unit 52 or ROM 53; a control unit 55 that controls overall operations based on the control programs loaded into the RAM 54; an input operation unit 56 constituted by numeric keys and other controls for entering telephone numbers, URLs and characters; a display unit 57 illustratively composed of a liquid crystal display panel for displaying the other party's telephone number and website pages; and a drive 58 that accommodates a small external storage unit such as an IC card.

When a user utilizes the mobile phone 40 of the above constitution for receiving a call, the device 40 works as follows: upon detecting an incoming call signal, the control unit 55 prompts the user suitably to push an off-hook button on the input operation unit 56. This allows the control unit 45 to establish a connection with a base station 2. Call data sent from the base station 2 are received by the antenna 41, amplified by the RF unit 42, and demodulated by the demodulator 43. The channel CODEC 44 extracts voice data from the demodulated data. The extracted voice data are decoded by the decoder 46 and converted to analog format by the D/A converter 47 before being output from the speaker 48. The voice data may be output alternatively from headphones or from an earphone in place of the speaker 48.

The voice spoken by the user is converted to analog format by the microphone 49 before being converted to a digital signal by the A/D converter 50. The digitized voice data are encoded by the encoder 51 and channel-coded by the channel CODEC 44. The voice data are then modulated by the modulator 45, amplified by the RF unit 42 and transmitted from the antenna 41 to the base station 2.

Suppose that the mobile phone 40 receives via the antenna 41 text data such as "BCA (a person's name), congratulations on your 20th birthday," voice data that sound like "Let's have a birthday party on (a specific date)," and music data making up a specific piece of music associated with birthdays, sent from the server device 30 by way of the central management device 70. In that case, the received data are amplified by the RF unit 42 and demodulated by the demodulator 43. The channel CODEC 44 extracts the text data, voice data and music data, as well as advertisement data if any, from the demodulated data. The extracted voice data and music data are decoded by the decoder 46 and converted to analog format by the D/A converter 47 before being output from the speaker 48. At the same time, the text data and advertisement data are displayed on the display unit 57 by the control unit 55. The user is thus able to hear the voice of the transmitting party while viewing the text data and advertisement data on the display unit 57.

On the mobile phone 40, the user may download necessary application programs by attaching an external storage unit containing the programs to the drive 58 and retrieving them from the attached unit. Alternatively, the application programs may be installed into the storage unit 52 by having them downloaded from appropriate locations.

The sponsor's terminal device 60 for uploading advertisement data to the server device 30 is structured substantially as an ordinary personal computer. As such, the sponsor's terminal device 60 comprises a hard disc (HD) 61 that retains advertisement data together with various application programs such as a browser for browsing websites established by the server device 30; a read-only memory (ROM) 62 that accommodates control programs for controlling the device as a whole; a random-access memory (RAM) 63 into which programs are loaded from the HD 61 or ROM 62; a transmitter-receiver 64 for exchanging data with the server device 30; an input operation unit 65 for making data entries; a display unit 66 for displaying website pages or the like downloaded from the server device 30; and a central processing unit (CPU) 68 that controls the whole device based on the programs loaded into the RAM 63.

At the sponsor's terminal device 60, the input operation unit 65 is operated to input a URL for the advertisement data to be attached to a greeting message that will be sent from the transmitting party's terminal device 10 to the mobile phone 40. The CPU 68 operating under transmission control protocols causes the transmitter-receiver 64 to transmit the advertisement data to the server device 30.

The sponsor's terminal device 60 may have necessary application programs installed into the HD 61 by attaching an external storage unit containing the programs to the drive 67 and retrieving them from the attached unit. Alternatively, the application programs may be installed into the HD 61 by having them downloaded from appropriate locations.

The central management device 70 manages the entire wireless communication network made up of the mobile phones 40. As such, the central management device 70 typically comprises a transmitter-receiver 71 that exchanges data with the base stations 2 and with the server device 30; a CODEC 72 that encodes and decodes data; a ROM 73 that stores control programs and the like for controlling overall operations; a RAM 74 into which the control programs are loaded from the ROM 73 or other locations; a storage unit 75 that accommodates call management data and other data about the mobile phones 40; and a control unit 76 that controls overall operations based on the programs loaded into the RAM 74.

The central management device 70 is designed to control a plurality of base stations 2 and to act as an exchange permitting calls between the mobile phones 40. The device 70 also retains call fee data calculated on the basis of call times run up by individual users of the mobile phones 40, as well as account access key data for gaining access to account data held by the charge server device 80.

The charge server device 80 for settling accounts comprises a transmitter-receiver 81 that exchanges data with the server device 30 and with the central management device 70; a CODEC 82 that encodes and decodes data; a ROM 83 that stores control programs and the like for controlling overall operations; a RAM 84 into which the programs are loaded from the ROM 83 or other locations; a storage unit 85 that retains account data and other data; and a control unit 86 that controls overall operations based on the programs loaded into the RAM 84.

In the charge server device 80, the storage unit 85 retains account data on the sponsors as well as account data on the users of the mobile phones 40. Upon receipt of an access request or account key data from the server device 30 or from the central management device 70, the charge server device 80 causes its control unit 86 to carry out an authentication process on what has been received. When the request or data in question are duly authenticated, the charge server device 80 updates the applicable account data.

Figure 2:
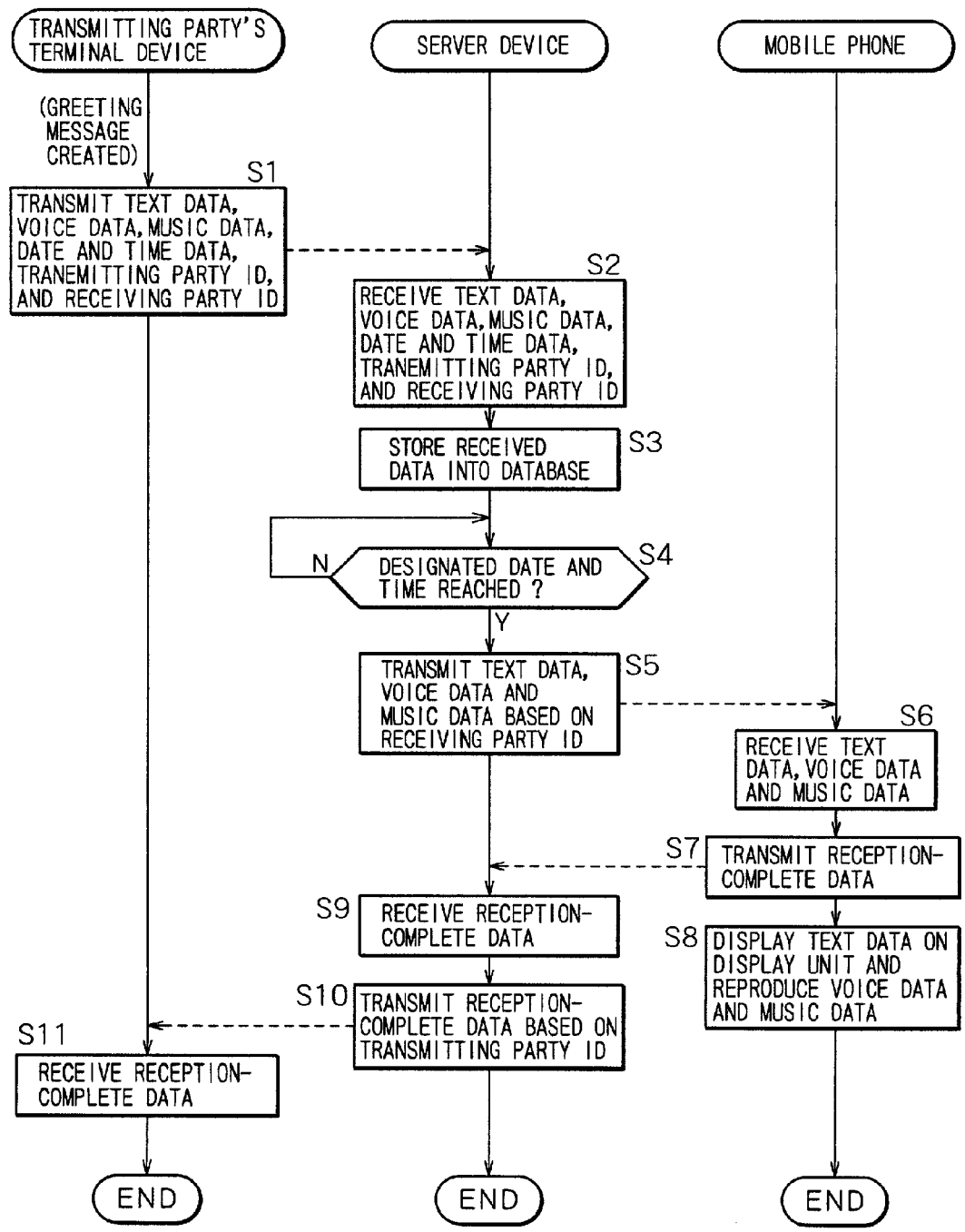
FIG. 2 is a flowchart of steps constituting a method for allowing a greeting message transmitted from a transmitting party's terminal device to reach a mobile phone.

Described below with reference to FIG. 2 is a series of steps in which the owner of the transmitting party's terminal device transmits a greeting message to the user of the mobile phone 40.

The transmitting party at the terminal device 10 first creates a greeting message. Illustratively, the transmitting party operates the input operation unit 21 to start the word processing program, inputs a text such as "BCA (a person's name), congratulations on your 20th birthday," and saves the text data onto the HD 11. When creating a greeting message by voice, the transmitting party may speak an expression such as "Let's have a birthday party on (a specific date)" into the microphone 19. The voice spoken by the user is converted to an analog electrical signal by the microphone 19 before 0being converted to a digital signal by the A/D converter 20. The digitized voice data are encoded by the CODEC 16 and saved onto the HD 11.

In step S1 of FIG. 2, the transmitting party's terminal device 10, given a suitable URL by the user through the input operation unit 21, transmits the greeting message made up of text data, voice data and/or music data to the server device 30 in keeping with transmission control protocols. The transmitting party's terminal device 10 transmits such greeting message to the server device 30 together with a transmitting party ID for identifying the transmitting party, a receiving party ID for identifying the receiving party, and date and time data for designating a desired date and time at which the greeting message is to be delivered to the receiving party's mobile phone 40.

In step S2, the server device 30 receives from the transmitting party's terminal device 10 the greeting message, transmitting party ID, receiving party ID, and date and time data by way of the transmitter-receiver 34. In step S3, the server device 30 updates its database in the storage unit 31 based on the received data.

The database in the storage unit 31 of the server device 30 is typically structured as shown in Table 1 below.

TABLE 1

| TRANSMITTING PARTY ID | RECEIVING PARTY ID | DATE AND TIME DATA | GREETING MESSAGE |
|---|---|---|---|
| AAA co.jp | ABC ne.jp | 12:00/12/24/2000 | VOICE DATA, MUSIC DATA |
| BBB ne.jp | 09012345678 | 11:00/11/20/2000 | TEXT DATA, VOICE DATA |
| CCC.com | 09098765432 | 00:00/01/01/2001 | TEXT DATA, VOICE DATA, MUSIC DATA |
| DDD co.jp | BCA ne.jp | 18:30/12/24/2000 | TEXT DATA, VOICE DATA, MUSIC DATA |
| ... | ... | ... | ... |
| ... | ... | ... | ... |
| ... | ... | ... | ... |

As listed in Table 1, the transmitting party ID is typically an e-mail address of the transmitting party's terminal device 10, and the receiving party ID is a telephone number or an e-mail address of the receiving party's mobile phone 40. The date and time data are made up of a time-of-day, a day of the month, and a year. The database stores text data, voice data and music data constituting greeting messages in association with transmitting party IDs. Illustratively, a transmitting party ID "AAA co.jp" in storage is associated with three kinds of data: a receiving party ID "ABC ne.jp" specific to the mobile phone 40, date and time data "12:00/12/24/2000," and voice and music data.

After receiving the data from the transmitting party's terminal device 10 in step S2, the server device goes to step S3. In step S3, the server device 30 updates its database as needed.

In step S4, the server device 30 checks to see if the date and time designated by each transmitting party's terminal device 10 are reached. If the designated date and time are judged reached, the server device 30 goes to step S5. If the designated date and time are not judged reached, then step S4 is repeated.

In step S5, the server device 30 transmits the greeting message, i.e., the text data, voice data and/or music data to the mobile phone 40 based on the receiving party ID such as the e-mail address or telephone number.

In step S6, the mobile phone 40 in a standby status receives an incoming call signal from the base station 2 and plays a ring tone in response. The user illustratively pushes an off-hook button on the input operation unit 56 to establish a connection with the base station 2. This allows the mobile phone 40 to download the greeting message from the server device 30. Alternatively, the greeting message may be downloaded automatically into the storage unit 52 of the mobile phone 40 without the user pushing the off-hook button.

In step S7, with the greeting message downloaded, the mobile phone 40 transmits to the server device 30 reception-complete data indicating that the greeting message has all been downloaded.

In step S8, the mobile phone 40 reproduces the downloaded greeting message. More specifically, the greeting message from the server device 30 is received by the mobile phone 40 via the antenna 41, amplified by the RF unit 42 and demodulated by the demodulator 43. The channel CODEC 44 extracts the text data, voice data and music data from the demodulated data. The extracted voice data and music data are decoded by the decoder 46 and converted to analog format by the D/A converter 47 before being output from the speaker 48. At the same time, the text data are displayed on the display unit 57 by the control unit 55. The user is thus able to hear the voice of the transmitting party while viewing the text data on the display unit 57.

When the mobile phone 40 transmits the reception-complete data to the server device 30 in step S7, the server device 30 receives the transmitted reception-complete data in step S9. In step S10, the server device 30 forwards over the Internet 3 the reception-complete data to the transmitting party's terminal device 10 based on the transmitting party ID consisting of the e-mail address. In step S11, the transmitting party's terminal device 10 receives the reception-complete data. The reception-complete data allow the transmitting party to ascertain that the greeting message was delivered to its destination at the designated date and time.

As described, the inventive data transmission-reception system 1 permits the greeting message to reach the specified receiving party's mobile phone 40 at the date and time desired by each transmitting party. The greeting message delivered in a timely manner gives much satisfaction to the receiving party.

Figure 3:
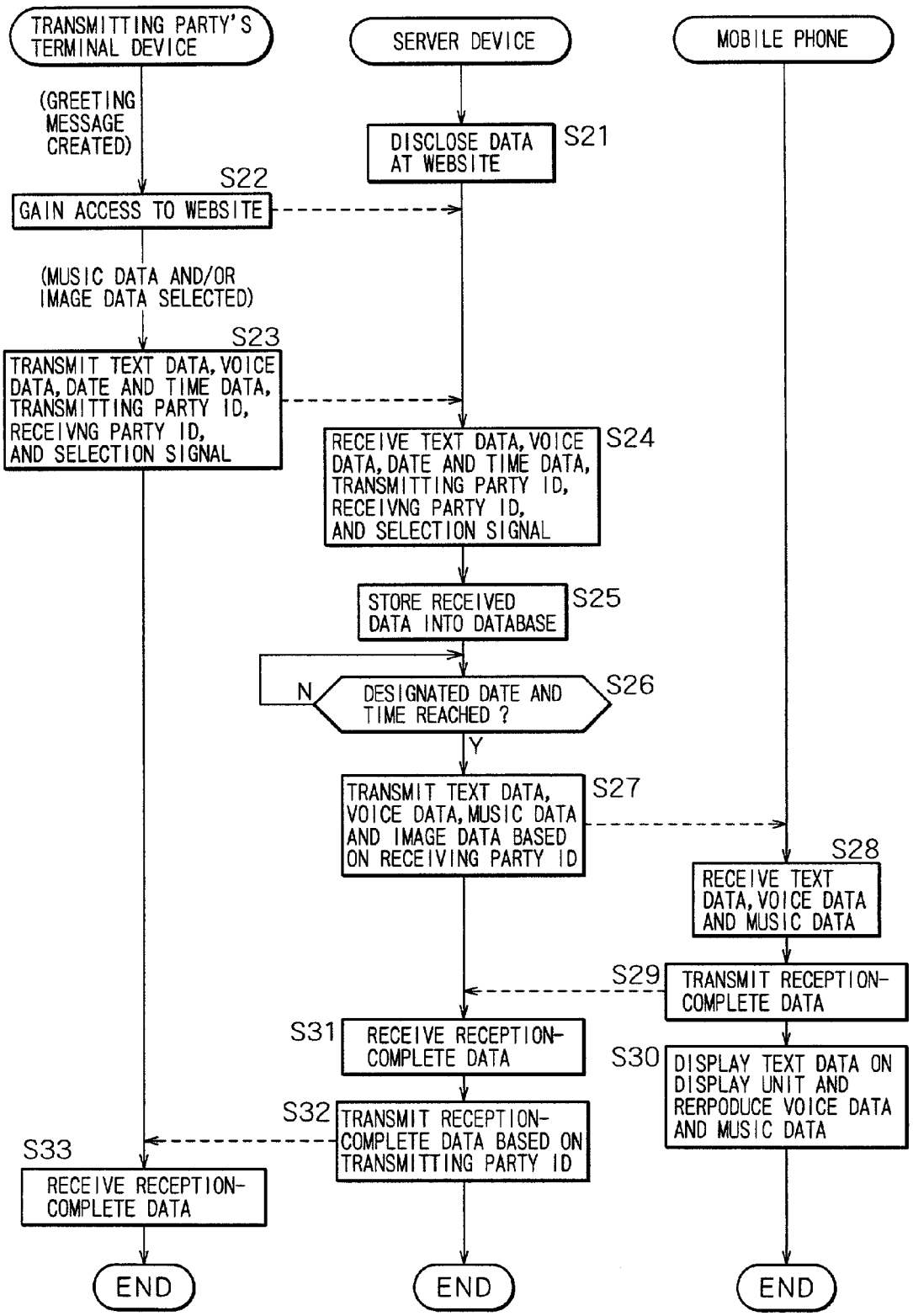
FIG. 3 is a flowchart of steps performed by a system allowing a transmitting party at his or her terminal device to select music data and/or image data by gaining access to a website before transmitting a greeting message together with the selected data to a mobile phone.

Described below with reference to FIG. 3 is a series of steps performed by the data transmission-reception system allowing the owner of the transmitting party's terminal device 10 to transmit a greeting message to the user of the mobile phone 40 together with music data and/or image data selected as an attachment to the message from a website page provided by the server device 30.

In step S21 of FIG. 3, the server device 30 discloses at its website music data and/or image data that may be selected by the transmitting party's terminal device 10 as an attachment to the greeting message destined for the mobile phone 40.

Illustratively, as shown in FIG. 4, the website page may take the form of a table having a music division and an image division, each division comprising titles suitable for, say, four different occasions: birthday, wedding, graduation, and admission to school. In the music division, under the heading of each different occasion are a number of titles of music each matched with a sampling key that may be operated to sample the corresponding piece of music. In the image division, under the heading of each different occasion are a number of titles representing different images.

The transmitting party at the terminal device 10 first creates a greeting message by voice and/or in text. In step S22, the transmitting party's terminal device 10, given a suitable URL by the user through the input operation unit 21, gains access to the server device 30 to download the website page of FIG. 4 for display onto the display unit 22. Viewing the displayed website page, the transmitting party selects appropriate music data and/or image data as an attachment to the voice data and image data.

Illustratively, suppose that the transmitting party, using the mouse of the input operation unit 21, clicks on the sampling key corresponding to title "A" in the music division. In that case, the relevant music data are downloaded to the terminal device 10, decoded by the CODEC 16 and converted from digital to analog format by the D/A converter 17 before being output from the speaker 18. The transmitting party is then able to sample the selected music data. Clicking on title "O" in the image division using the mouse of the input operation unit 21 causes the transmitting party's terminal device 10 to download the corresponding image data for display onto the display unit 22. This allows the transmitting party to view the selected image.

The transmitting party designates the preferred music data and/or image data illustratively by operating the input operation unit 21. In step S23, a click on a SEND button causes the transmitting party's terminal device 10 to transmit to the server device 30 the voice data and text data constituting the greeting message. Along with the greeting message, the transmitting party's terminal device 10 transmits the transmitting party ID identifying the transmitting party, a receiving party ID identifying a specific receiving party, and date and time data designating a desired date and time at which the greeting message is to be delivered to the receiving party's mobile phone 40. The terminal device 10 also transmits to the server device 30 a selection signal for selecting the music data and image data from the website page.

In step S24, the server device 30 receives from the transmitting party's terminal device 10 the greeting message together with the transmitting party ID, receiving party ID, date and time data, and selection signal. In step S25, the server device 30 updates its database in the storage unit 31 accordingly.

In the example above, the database in the storage unit 31 of the server device 30 is typically structured as shown in Table 2 below.

TABLE 2

| TRANS-MITTING PARTY ID | RECEIVING PARTY ID | DATE AND TIME DATA | GREETING MESSAGE | AT-TACHED DATA ID |
|---|---|---|---|---|
| AAA co.jp | ABC ne.jp | 12:00/ 12/24/2000 | VOICE DATA | B, P |
| BBB ne.jp | 09012345678 | 11:00/ 11/20/2000 | TEXT DATA, MUSIC DATA | A, O |
| CCC.com | 09098765432 | 00:00/ 01/01/2001 | TEXT DATA | C |
| DDD co.jp | BCA ne.jp | 18:30/ 12/24/2000 | TEXT DATA, VOICE DATA | W |
| ... | ... | ... | ... | ... |
| ... | ... | ... | ... | ... |
| ... | ... | ... | ... | ... |

In Table 2, as in Table 1 shown earlier, the stored data from each transmitting party's terminal device 10 are constituted by a transmitting party ID in association with a receiving party ID, date and time data, a greeting message made of voice data and/or text data, and attached data. The attached data are represented by the selection signal making up an attached data ID which is in fact an ID of the music data and/or image data selected from the website page of FIG. 4 by the transmitting party's terminal device 10. As such, the attached data are also associated with the transmitting party ID.

After receiving the data from the transmitting party's terminal device 10 in step S24, the server device 30 goes to step S25. In step S25, the server device 30 updates its database as needed.

In step S26, the server device 30 checks to see if the date and time designated by each transmitting party's terminal device 10 are reached. If the designated date and time are judged reached, the server device 30 goes to step S27. If the designated date and time are not judged reached, then step S26 is repeated.

In step S27, the server device 30 transmits the greeting message, i.e., the text data and voice data, as well as the music data constituting the attached data to the mobile phone 40 based on the receiving party ID such as the e-mail address or telephone number.

In step S28, the mobile phone 40 in a standby status receives an incoming call signal from the base station 2 and plays the ring tone in response. The user illustratively pushes the off-hook button on the input operation unit 56 to establish a connection with the base station 2. This allows the mobile phone 40 to download the greeting message from the server device 30. Alternatively, the greeting message may be downloaded automatically into the storage unit 52 of the mobile phone 40 without the user pushing the off-hook button.

In step S29, with the greeting message and attached data downloaded, the mobile phone 40 transmits to the server device 30 reception-complete data indicating that the greeting message has been downloaded.

In step S30, the mobile phone 40 reproduces the downloaded greeting message. More specifically, the greeting message and the attached data from the server device 30 are received by the mobile phone 40 via the antenna 41, amplified by the RF unit 42 and demodulated by the demodulator 43. The channel CODEC 44 extracts the text data and voice data, as well as the music data and image data constituting the attached data from the demodulated data. The extracted voice data and music data are decoded by the decoder 46 and converted to analog format by the D/A converter 47 before being output from the speaker 48. At the same time, the text data and image data are displayed on the display unit 57 by the control unit 55. The user is thus able to hear the voice of the transmitting party while viewing the text data and image data on the display unit 57.

When the mobile phone 40 transmits the reception-complete data to the server device 30 in step S29, the server device 30 receives the transmitted reception-complete data in step S31. In step S32, the server device 30 forwards over the Internet 3 the reception-complete data to the transmitting party's terminal device 10 based on the transmitting party ID consisting of the e-mail address or the like. In step S33, the transmitting party's terminal device 10 receives the reception-complete data. The reception-complete data allow the transmitting party to ascertain that the greeting message was delivered to its destination at the designated date and time.

The above-described data transmission-reception system 1 permits the greeting message to reach the specified receiving party's mobile phone 40 at the date and time desired by the transmitting party. The greeting message delivered in a timely manner gives much satisfaction to the receiving party.

Figure 5:
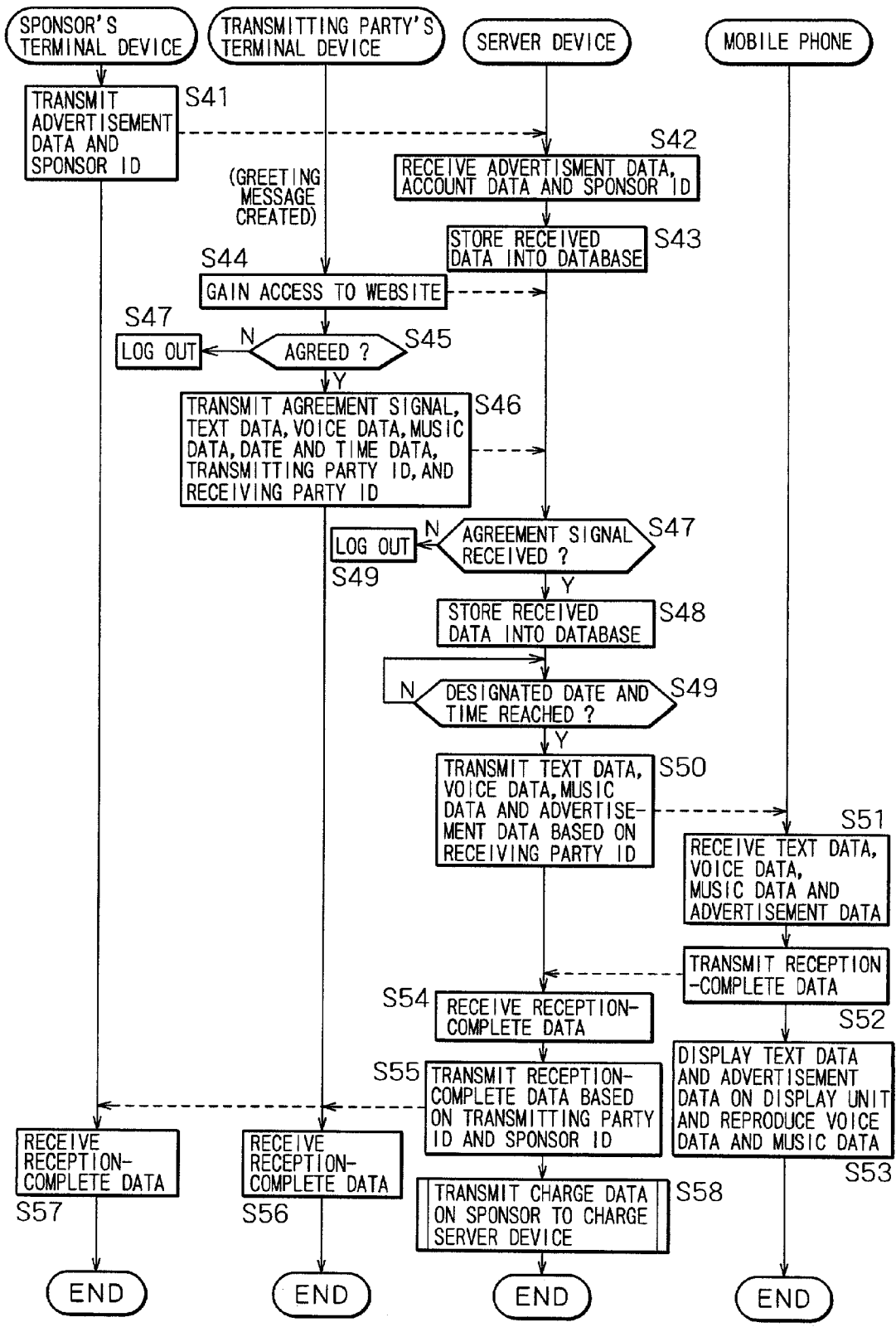
FIG. 5 is a flowchart of steps performed by a system allowing advertisement data to be attached to a greeting message.

Described below with reference to FIG. 5 is a series of steps in which advertisement data are attached illustratively to a greeting message to be transmitted from the transmitting party's terminal device 10.

In step S41 of FIG. 5, the sponsor's terminal device 60 transmits advertisement data as an attachment to a greeting message, a sponsor ID identifying the sponsor, and the sponsor's account data to the server device 30 through the transmitter-receiver 64. In step S42, the server device 30 receives the advertisement data, account data, and sponsor ID. In step S43, the server device 30 stores the received advertisement data, account data and sponsor ID into the database in the storage unit 31.

The transmitting party at the terminal device 10 creates a greeting message made up of voice data, text data and/or music data. In step S44, with a suitable URL entered through the input operation unit 21, the transmitting party's terminal device 10 operating under transmission control protocols gains access to the website offering this service and downloads the relevant website pages for display onto the display unit 22.

In step S45, the transmitting party at the terminal device 10 decides whether or not to agree to attaching the advertisement data to the greeting message (i.e., text data, voice data, music data) to be uploaded to the server device 30 for eventual transmission to the mobile phone 40. If the transmitting party agrees to attaching the advertisement data to the greeting message destined for the mobile phone 40, the transmitting party's terminal device 10 goes to step S46; if such an agreement is rejected, then the terminal device 10 reaches step S47 and logs out.

In step S46, the transmitting party's terminal device 10 transmits the greeting message composed of text data, voice data and/or music data to the server device 30. Along with the greeting message, the transmitting party's terminal device 10 transmits the transmitting party ID identifying the transmitting party, a receiving party ID identifying a specific receiving party, and date and time data designating a desired date and time at which the greeting message is to be delivered to the receiving party's mobile phone 40. The terminal device 10 also transmits to the server device 30 an agreement signal indicating that the transmitting party has agreed to attaching the advertisement data to the greeting message destined for the mobile phone 40.

In step S47, the server device 30 checks to see if the data received from the transmitting party's terminal device 10 include the agreement signal. If the agreement signal is judged included, step S48 is reached; if the signal is not found, then the server device 30 goes to step S49 and logs out.

In step S48, the server device 30 receives via the transmitter-receiver 34 the greeting message, transmitting party ID, receiving party ID, and date and time data from the transmitting party's terminal device 10, and updates accordingly in the storage unit 31 the database shown in Table 1 above.

In step S49, the server device 30 checks to see if the date and time designated by each transmitting party's terminal device 10 are reached. If the designated date and time are judged reached, the server device 30 goes to step S50. If the designated date and time are not judged reached, then step S49 is repeated. In step S50, the server device 30 transmits the greeting message, i.e., the text data, voice data and music data, as well as the advertisement data to the mobile phone 40 based on the receiving party ID such as the e-mail address or telephone number as listed in Table 1.

In step S51, the mobile phone 40 in a standby status receives an incoming call signal from the base station 2 and plays the ring tone in response. The user illustratively pushes the off-hook button on the input operation unit 56 to establish a connection with the base station 2. This allows the mobile phone 40 to download the greeting message and advertisement data from the server device 30. Alternatively, the greeting message and advertisement data may be downloaded automatically into the storage unit 52 of the mobile phone 40 without the user pushing the off-hook button. In step S52, with the greeting message and advertisement data downloaded, the mobile phone 40 transmits to the server device 30 reception-complete data indicating that the greeting message has been downloaded.

In step S53, the mobile phone 40 reproduces the downloaded greeting message and advertisement data. More specifically, the greeting message and the advertisement data from the server device 30 are received by the mobile phone 40 via the antenna 41, with the greeting message amplified by the RF unit 42 and with the data demodulated by the demodulator 43. The channel CODEC 44 extracts the text data, voice data, music data, and advertisement data from the received data. The extracted voice data and music data are decoded by the decoder 46 and converted to analog format by the D/A converter 47 before being output from the speaker 48. At the same time, the text data and advertisement data are displayed on the display unit 57 by the control unit 55. The user is thus able to hear the voice of the transmitting party while viewing the text data as well as the advertisement data on the display unit 57.

When the mobile phone 40 transmits the reception-complete data to the server device 30 in step S52, the server device 30 receives the transmitted reception-complete data in step S54. In step S55, the server device 30 forwards over the Internet 3 the reception-complete data to the transmitting party's terminal device 10 based on the transmitting party ID as well as to the sponsor's terminal device 60 according to the sponsor ID.

In step S56, the transmitting party's terminal device 10 receives the reception-complete data. The reception-complete data allow the transmitting party to ascertain that the greeting message was delivered to its destination at the designated date and time. In step S57, the sponsor's terminal device 60 receives the reception-complete data. This allows the sponsor to verify that the advertisement data originating from the terminal device 60 reached the owner of the mobile phone 40.

Figure 6:
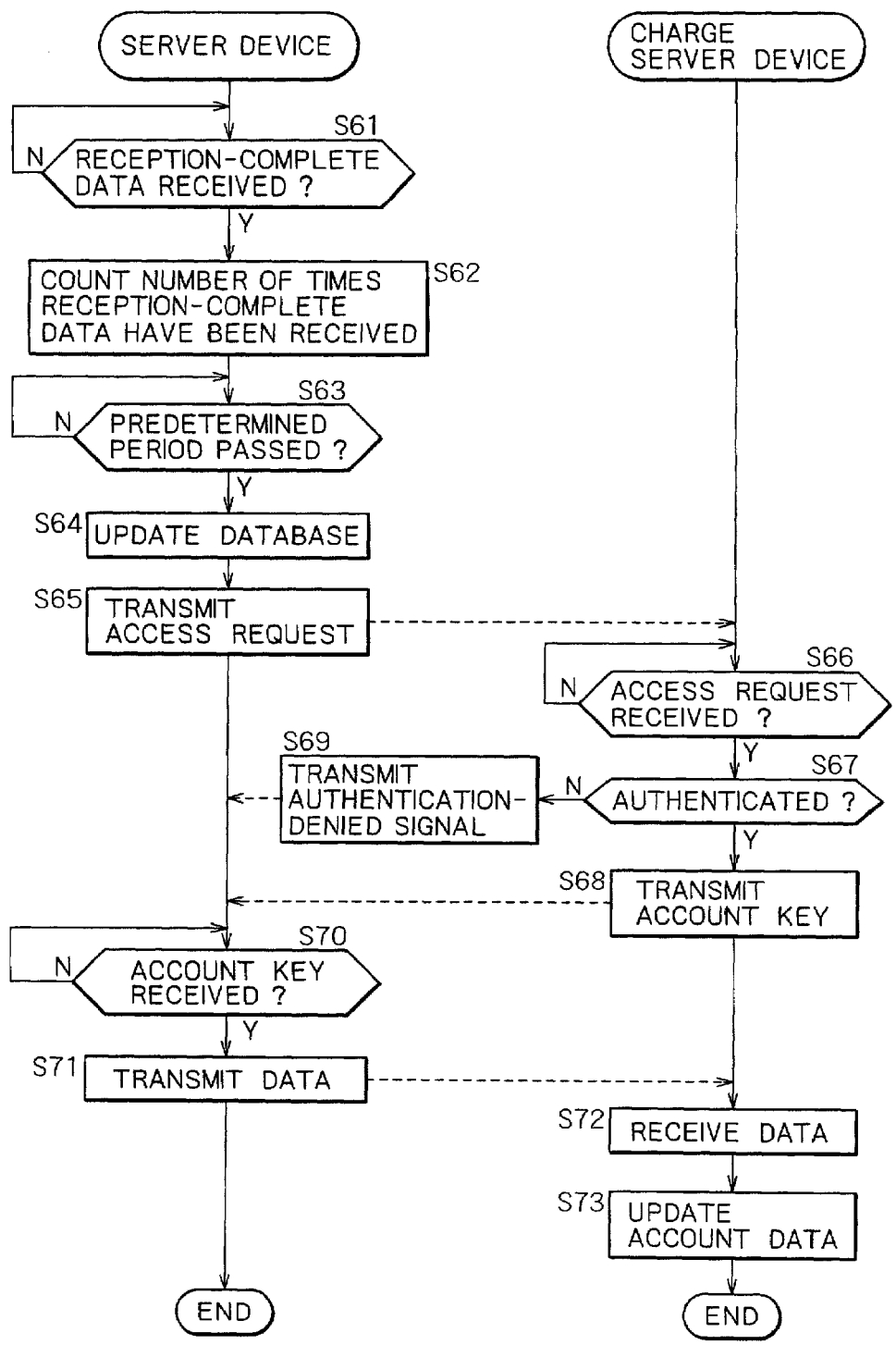
FIG. 6 is a flowchart of steps constituting a charge settlement process carried out by the system of FIG. 5.

In step S58, the server device 30 transmits charge data on the sponsor to the charge server device 80. How such charge data are settled will now be described by referring to FIG. 6.

In step S61, the server device 30 checks to see if the reception-complete data were received from the mobile phone 40 in step S54 of FIG. 5. If the reception-complete data are judged received, step S62 is reached; if the data are not judged received, then step S61 is repeated. Step S61 thus involves determining whether the service contracted with the sponsor has been honored and completed. In step S62, the server device 30 counts the number of times the reception-complete data were received by each mobile phone 40. The counts serve as a basis for charging the sponsor in proportion to the number of times the advertisement data were transmitted from the sponsor's terminal device 60. In step S63, the server device 30 checks to see if a predetermined period (e.g., one month) has elapsed.

In step S64, the server device 30 generates charge data on each sponsor and updates the database accordingly.

In this example, the database in the storage unit 31 is structured illustratively as shown in Table 3 below.

TABLE 3

| SPONSOR ID | BASIC CHARGE (IN ¥) | TRANSMISSION COUNT (× ¥100) | TOTAL AMOUNT (IN ¥) |
|---|---|---|---|
| 1 | 100000 | 100 | 110000 |
| 2 | 100000 | 200 | 120000 |
| 3 | 100000 | 300 | 130000 |
| 4 | 100000 | 400 | 140000 |
| ... | ... | ... | ... |

TABLE 3-continued

Suppose that the basic charge of this system is ¥100,000 and that a single transmission costs an additional ¥100 per month. Illustratively, sponsor 1 in Table 3 has run up a transmission count of 100 and is thus charged a total amount of ¥110,000. Likewise, sponsor 2 has racked up a transmission count of 200 and is charged ¥120,000 in total; sponsor 3 has tallied a transmission count of 300 and is charged a total of ¥130,000; sponsor 4 has scored a transmission count of 400 and is charged a total amount of ¥140,000. The server device 30 in this manner generates charge data representing the total amounts reflecting the advertisement data transmission count of each sponsor within the predetermined period, and updates the database accordingly.

In step S65, the server device 30 sends an access request together with its server ID to the charge server device 80 over the leased line 4. In step S66, the charge server device 80 in a standby status checks whether any access request has been received. If the access request is judged received; step S67 is reached; if no access request is judged received, then step S66 is repeated. In step S67, the charge server device 80 carries out an authentication process on the server ID sent from the server device 30. When the server ID is duly authenticated, the charge server device 80 goes to step S68. If authentication is denied, then step S69 is reached.

It is assumed that the sponsors, i.e., owners of the terminal devices 60, have specified their bank accounts before applying for the service of this system and that the charge server device 80 retains sponsor account keys in correspondence with these accounts. When the server ID is authenticated in step S67, the charge server device 80 goes to step S68 and transmits the relevant sponsor account key to the server device 30.

If the server ID is not authenticated in step S67, the charge server device 80 transmits an authentication-denied signal to the server device 30, telling the administrator of the server device 30 (i.e., administrator of this system) that authentication has been denied.

In step S70, the server device 30 determines whether the sponsor account key is received. If the sponsor account key is judged received, step S71 is reached; if no account key is judged received, then step S70 is repeated. In step S71, the server device 30 transmits to the charge server device 80 the charge data on each sponsor along with the corresponding sponsor account key, as shown in Table 3.

In step S72, the charge server device 80 on standby receives the sponsor account keys and charge data from the server device 30. In step S73, the charge server device 80 updates its database constituted by records of dates, payment and deposit transactions, account balances, etc., so as to reflect the charge data on the sponsors transmitted from the server device 30.

Specifically, the charge server device 80 subtracts from each sponsor's account data an amount designated by the applicable charge data from the server device 30, and transfers the subtracted amount to the account data of the administrator managing the server device 30.

As described, the inventive data transmission-reception system 1 permits the greeting message to reach the specified receiving party's mobile phone 40 at the date and time desired by the transmitting party. The greeting message delivered in a timely manner gives much satisfaction to the receiving party. When the greeting message is downloaded to the mobile phone 40, the display unit 57 of the mobile phone 40 displays the advertisement data together with the greeting message, which proves to be a highly efficient advertising tool.

In the preceding example, the advertisement data were shown made up of image data. Alternatively, the advertisement data may be composed of voice data, image data, or a combination of such data.

Figure 7:
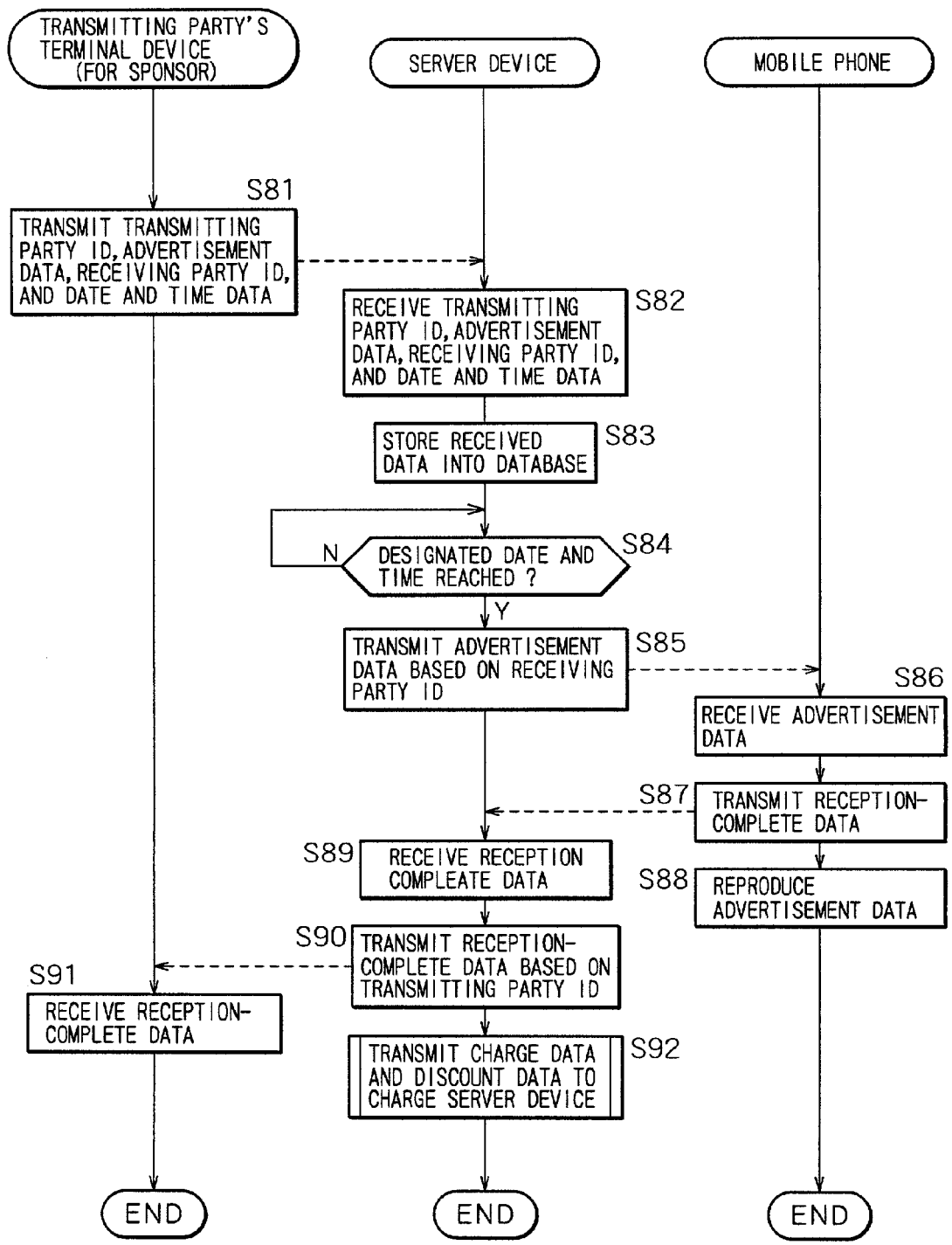
FIG. 7 is a flowchart of steps performed by a system allowing a transmitting party at his or her terminal device to transmit advertisement data to a mobile phone.

Described below with reference to FIG. 7 is an example in which content data constituted not by a greeting message but by advertisement data are transmitted to the mobile phone 40. In this case, the owner of the transmitting party's terminal device 10 acts as the sponsor.

In step S81, the transmitting party's terminal device 10 owned by the sponsor, given a suitable URL through the input operation unit 21, transmits advertisement data to the server device 30 in keeping with transmission control protocols. Along with the advertisement data, the transmitting party's terminal device 10 transmits the transmitting party ID identifying the transmitting party, a receiving party ID identifying a specific receiving party, and date and time data designating a desired date and time at which the advertisement data are to be delivered to the receiving party's mobile phone 40. The advertisement data to be uploaded here to the server device 30 may be constituted by voice data, music data, image data, moving picture data, or a combination of such data.

In step S82, the server device 30 receives via the transmitter-receiver 34 the advertisement data, transmitting party ID, receiving party ID, and date and time data from the transmitting party's terminal device 10. In step S83, the server device 30 updates its database in the storage unit 31 based on the received data.

In this example, the database in the storage unit 31 of the server device 30 is typically structured as shown in Table 4 below.

TABLE 4

| TRANSMITTING PARTY ID | DATE AND TIME DATA | RECEIVING PARTY ID |
|---|---|---|
| AAA co.jp | 18:00/12/24/2000 | ABC ne.jp |
| | | 09012345678 |
| | | 09098765432 |
| | | BCA ne.jp |
| | | ... |
| | | ... |
| | | ... |
| BBB ne.jp | 00:00/01/01/2001 | 09014785236 |
| | | 09096325874 |
| | | DDD co.jp |
| | | CBD ne.jp |
| | | ... |
| | | ... |
| | | ... |
| ... | ... | ... |

As listed in Table 4, the transmitting party ID identifying the sponsor is typically an e-mail address of the transmitting party's terminal device 10, and the receiving party ID is a telephone number or an e-mail address of the receiving party's mobile phone 40. The date and time data are made up of a time-of-day, a day of the month, and a year. In the database, each transmitting party ID is associated with date and time data, receiving party IDs, and advertisement data.

Illustratively, a transmitting party ID "AAA co.jp" in Table 4 is associated with date and time data "18:00/12/24/2000," as well as receiving party IDs "ABC ne.jp," "09012345678," "09098765432," "BCAne.jp," etc. After receiving the data from the transmitting party's terminal device 10 in step S82, the server device 30 goes to step S83. In step S83, the server device 30 updates its database as needed.

In step S84, the server device 30 checks to see if the date and time designated by each transmitting party's terminal device 10 are reached. If the designated date and time are judged reached, the server device 30 goes to step S85. If the designated date and time are not judged reached, then step S84 is repeated.

In step S85, the server device 30 transmits the advertisement data to the mobile phone 40 based on the receiving party ID such as the e-mail address or telephone number. In step S86, the mobile phone 40 in a standby status receives an incoming call signal from the base station 2 and plays a ring tone in response. The user illustratively pushes the off-hook button on the input operation unit 56 to establish a connection with the base station 2. This allows the mobile phone 40 to download the advertisement data from the server device 30. Alternatively, the advertisement data may be downloaded automatically into the storage unit 52 of the mobile phone 40 without the user pushing the off-hook button.

In step S87, with the advertisement data downloaded, the mobile phone 40 transmits to the server device 30 reception-complete data indicating that the advertisement data have all been downloaded.

In step S88, the mobile phone 40 reproduces the downloaded advertisement data. More specifically, the advertisement data from the server device 30 are received by the mobile phone 40 via the antenna 41, amplified by the RF unit 42 and demodulated by the demodulator 43. The channel CODEC 44 extracts voice data, music data and image data from the demodulated data. The extracted voice data and music data are decoded by the decoder 46 and converted to analog format by the D/A converter 47 before being output from the speaker 48. At the same time, the image data are displayed on the display unit 57 by the control unit 55. The user is thus able to hear the voice of the sponsor while viewing the image data on the display unit 57.

Figure 8:
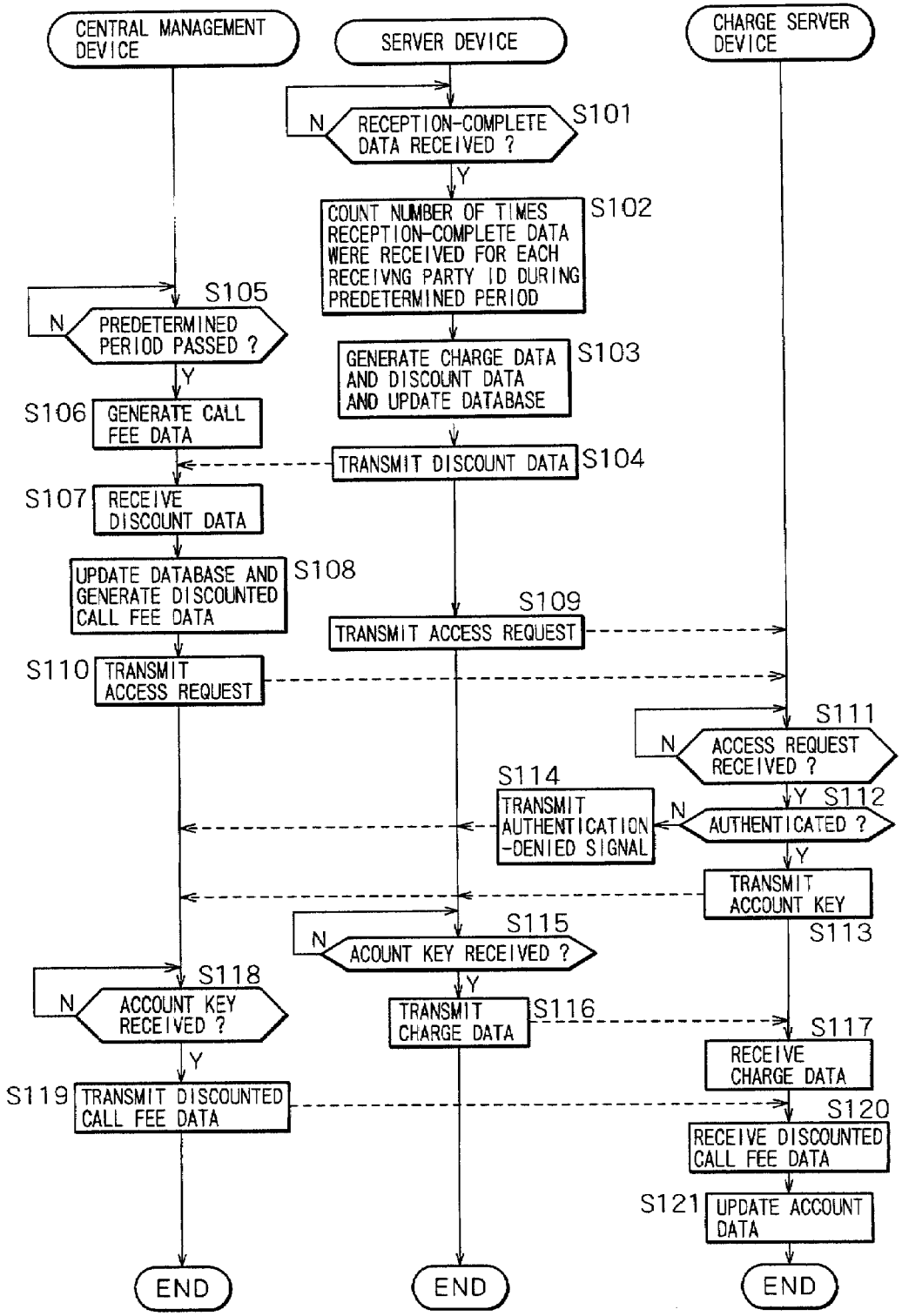
FIG. 8 is a flowchart of steps constituting another charge settlement process carried out by the system of FIG. 5.

When the mobile phone 40 transmits the reception-complete data to the server device 30 in step S87, the server device 30 receives the transmitted reception-complete data in step S89. In step S90, the server device 30 forwards over the Internet 3 the reception-complete data to the transmitting party's terminal device 10 (owned by the sponsor) based on the transmitting party ID consisting of the e-mail address. In step S91, the transmitting party's terminal device 10 receives the reception-complete data. The reception-complete data allow the transmitting party (i.e., the sponsor) to ascertain that the advertisement data were delivered to their destinations at the designated date and time. Thereafter, the server device 30 in step S91 generates charge data on each sponsor and transmits the generated charge data to the charge server device 80. The server device 30 also generates call fee discount data for the owner of the mobile phone 40 and transmits the generated data to the central management device 70. How such charge data and discount data are settled will now be described by referring to FIG. 8.

In step S101, the server device 30 checks to see if the reception-complete data were received from the mobile phone 40 in step S90 of FIG. 7. If the reception-complete data are judged received, step S102 is reached; if the data are not judged received, then step S101 is repeated. Step S101 thus involves determining whether the service contracted with the sponsor (i.e., delivery of advertisement data) has been honored and completed. In step S102, the server device 30 counts the number of times the reception-complete data were received over a predetermined period with regard to each of the receiving party IDs identifying the mobile phones 40 involved. These steps allow the server device 30 to find out an advertisement data reception count of each mobile phone during the predetermined period.

In step S103, the server device 30 generates charge data on the owner (i.e., sponsor) of the transmitting party's terminal device 10 and call fee discount data for the owner of each mobile phone 40, and updates the database in the storage unit 31 accordingly.

In this example, the database in the storage unit 31 is structured illustratively as shown in Table 5 below.

TABLE 5

| TRANSMITTING PARTY (SPONSOR) | | | OWNER OF MOBILE PHONE | | |
|---|---|---|---|---|---|
| TRANSMITTING PARTY ID | DELIVERY COUNT | CHARGE DATA (IN ¥) | RECEIVING PARTY ID | RECEPTION COUNT | DISCOUNT DATA (IN ¥) |
| AAA co.jp | 1 | 100000 | ABC ne.jp | 2 | 200 |
| BBB ne.jp | 2 | 200000 | 09012345678 | 1 | 100 |
| CCC.com | 1 | 100000 | 09098765432 | 2 | 200 |
| DDD co.jp | 2 | 200000 | BCA ne.jp | 1 | 100 |
| ... | ... | ... | ... | ... | ... |
| ... | ... | ... | ... | ... | ... |
| ... | ... | ... | ... | ... | ... |

In the database, each transmitting party ID identifying the owner (i.e., sponsor) of a transmitting party's terminal device 10 is associated with an advertisement data delivery count and charge data. Illustratively, suppose that a single delivery of advertisement data costs ¥100,000 represented by charge data. In that case, as shown in Table 5, the sponsor with a transmitting party ID "AAA co.jp," having advertisement data delivered once, is charged ¥100,000; the sponsor with a transmitting party ID "BBB ne.jp," having advertisement data delivered twice, is charged ¥200,000; the sponsor with a transmitting party ID "CCC.com," having advertisement data delivered once, is charged ¥100,000; the sponsor with a transmitting party ID "DDD co.jp," having advertisement data delivered twice, is charged ¥200,000.

Also in the database, each receiving party ID identifying the owner of a mobile phone 40 is associated with a reception-complete data reception count and discount data over a predetermined period. It is assumed here that receiving advertisement data once affords a call fee discount of ¥100 represented by discount data. In that case, the owner of the mobile phone 40 with a receiving party ID "ABC ne.jp," having received advertisement data twice, is given a discount of ¥200; the mobile phone owner with a receiving party ID "09012345678," having received advertisement data once, is given a discount of ¥100; the mobile phone owner with a receiving party ID "09098765432," having received advertisement data twice, is given a discount of ¥200; the mobile phone owner with a receiving party ID "BCA ne.jp," having received advertisement data once, is given a discount of ¥100.

In step S103, the server device 30 updates the database as needed. In step S104, the server device transmits the discount data for the owners of the mobile phones 40 to the central management device 70.

In step S105, the central management device 70 checks to see if a predetermined period (e.g., one month) has elapsed. If the predetermined period is judged to have elapsed, step S106 is reached; if the predetermined period is not judged to have passed yet, then step S105 is repeated. In step S106, the central management device 70 generates call fee data in proportion to the call time run up during the month by the owner of each mobile phone 40. In step S107, the central management device 70 receives the call fee discount data transmitted from the server device 30 in step S104.

In step S108, the central management device 70 generates discounted call fee data reflecting the discount data from the server device 30, and updates as needed the database in the storage unit 75.

In this example, the database in the storage unit 75 is structured illustratively as shown in Table 6 below.

TABLE 6

| RECEIVING PARTY ID | CALL FEE DATA (IN ¥) | DISCOUNT DATA (IN ¥) | DISCOUNTED CALL FEE DATA (IN ¥) |
|---|---|---|---|
| ABC ne.jp | 9000 | 200 | 8800 |
| 09012345678 | 7000 | 100 | 6900 |
| 09098765432 | 5000 | 200 | 4800 |
| BCA ne.jp | 6000 | 100 | 5900 |
| ... | ... | ... | ... |
| ... | ... | ... | ... |
| ... | ... | ... | ... |

In the database, the owner of the mobile phone 40 with a receiving party ID "ABC ne.jp" is associated with discounted call fee data representing a fee of ¥8,800 with the discount data of ¥200 reflected in the call fee data of ¥9,000; the owner of the mobile phone 40 with a receiving party ID "109012345678" is associated with discounted call fee data of ¥6,900 with the discount data of ¥100 reflected in the call fee data of ¥7,000; the owner of the mobile phone 40 with a receiving party ID "09098765432" is associated with discounted call fee data of ¥4,800 with the discount data of ¥200 reflected in the call fee data of ¥5,000; the owner of the mobile phone 40 with a receiving party ID "BCA ne.jp" is associated with discounted call fee data of ¥5,900 with the discount data of ¥100 reflected in the call fee data of ¥6,000.

In step S109, the server device 30 sends an access request together with its server ID to the charge server device 80 over the leased line 4. In step S110, the central management device 70 likewise sends an access request together with its device ID to the charge server device 80 over the leased line 5. In step S111, the charge server device 80 on standby checks to see if any access request is received from the server device 30 or from the central management device 70.

If the access request is judged received, step S112 is reached; if no access request is judged received, then step S111 is repeated. In step S112, the charge server device 80 carries out an authentication process on the server ID sent from the server device 30 or on the device ID from the central management device 70. When the server ID is duly authenticated, the charge server device 80 goes to step S113. If authentication is denied, then step S114 is reached.

It is assumed that the sponsors, i.e., owners of the terminal devices 10, have specified their bank accounts before applying for the service of this system; that the charge server device 80 retains sponsor account keys in correspondence with these accounts; that the administrator of the central management device 70 has specified the administrator's account before applying for the service of this system; and that the charge serve device 80 retains an administrator account key relative to the administrator's account. When a server ID and/or a device ID is authenticated in step S112, the charge server device 80 goes to step S113 and transmits the relevant sponsor account key to the server device 30 and/or the administrator account key to the central management device 70.

If authentication is denied in step S114, then the charge server device 80 transmits an authentication-denied signal to the server device 30 and/or to the central management device 70. The signal reports the denial of server/device ID authentication to the administrator of the server device 30, i.e., administrator of this system, and/or to the administrator of the central management device 70.

In step S115, the server device 30 checks to see if any sponsor account keys have been received. If any sponsor account keys are judged received, step S116 is reached; if no sponsor account keys are judged received, then step S115 is repeated. In step S116, the server device 30 transmits the charge data on each sponsor to the charge server device 80 together with the sponsor account keys. In step S117, the charge server device 80 receives the sponsor account keys and the charge data from the server device 30.

In step S118, the central management device 70 checks to see if the administrator account key has been received. If the account key is judged received, step S119 is reached; if the key is not judged received, then step S118 is repeated. In step S119, the central management device 70 transmits to the charge server device 80 the administrator account key along with the discounted call fee data shown in Table 6 above. In step S120, the charge server device 80 receives the administrator account key and the discounted call fee data from the central management device 70.

In step S121, the charge server device 80 updates its database constituted by records of dates, payment and deposit transactions, account balances, etc., so as to reflect both the charge data on the sponsors from the server device 30 and the discounted call fee data from the central management device 70.

The above-described system has various applications, one of which may involve delivering advertisement data to the mobile phones 40 owned by those who purchased tickets to a concert of an artist, the delivery being timed to occur immediately before or after the concert so that the mobile phone owners in or near the concert hall may be presented with advertisements plugging CDs, posters and other items related to the artist. The system implementing such an application promises an enhanced advertising effect. The owner of each mobile phone 40 having received the advertisement data is eligible for a call fee discount. Such discounts offered by this system will attract a growing number of users who in turn will enliven the business activities of the parties involved.

The transmitting party's terminal device 10, server device 30, and the sponsor's terminal device 60 are each constituted by a general-purpose computer. A program or programs making up the series of steps described above may be installed upon use into each of these computers for execution, carried by a suitable program storage medium such as an optical disc, a magneto-optical disc, a magnetic disc, or an IC card accommodating a semiconductor memory. The storage medium is loaded into an external storage unit connected to the drives 23, 37 and 67 of the computers. Operating the drives 23, 37 and 67 causes the computer programs to be retrieved from the external storage unit and installed onto the HD 11 or 61 or into the storage unit 31 for execution. The programs may alternatively be installed into the computers via the Internet 3, over a LAN (local area network) or via a satellite link. On the mobile phone 40, an IC card is loaded into the drive 58 so that necessary programs are read from the card and installed into the storage unit 52. Obviously the programs may also be installed into the mobile phone 40 over the Internet 3 or by way of similar networks.

The use of the mobile phone 40 in the above-described system configuration is not limitative of the invention. Alternatively, any other type of portable mobile communication terminal device may replace the mobile phone 40 in the system.

Music data are transmitted and received rapidly over the Internet 3 when compressed by such methods as ATRAC3 (Adaptive Transform Acoustic Coding 3; trademark), MPEG-2AAC (Moving Picture Experts Group 2 Advanced Audio Coding; trademark), MP3 (MPEG-1 Audio Layer 3; trademark), TwinVQ (Transform-Domain Weighted Interleave Vector Quantization; trademark), MS Audio (WMA: Windows Media Audio; trademark), or Ogg Vorbis (trademark).

Alternatively, the music data may be replaced with promotion video data accompanied by music. Such video data may be compressed by such methods as MPEG4 or MPEG7 for rapid transmission and reception.

As another alternative, the server device 30 and the charge server device 80 may be constituted by the same piece of equipment for purpose of simplification.

As described, the inventive system and method allow the transmitting party to deliver desired content data to the designated receiving party's terminal device at a date and time preferred by the transmitting party. The content data are thus sent to their destinations in a well-timed manner for maximum effectiveness.

While a preferred embodiment of the present invention has been described using specific terms, such description is for illustrative purposes only, and it is to be understood that changes and variations may be made without departing from the spirit or scope of the following claims.

What is claimed is:

1. A communication system comprising:
   a first communication device configured to transmit outgoing data including content identification data, transmit party identification data, and receive party identification data, and date and time data;
   a second communication device configured to receive said outgoing data and configured to transmit digital audio content data identified by said content identification data to a receiving party identified by said receiving party identification data at a date and time corresponding to said date and time data, said digital audio content data being compressed; and a third wireless communication device configured to receive and store said digital audio content data transmitted from said second communication device without pushing an off-hook button and configured to decode said digital audio content data.

2. A communication system according to claim 1, wherein said first communication device transmits said content data as said content identification data to said second communication device.

3. A communication system according to claim 1, wherein said first communication device has:

an inputting device configured to output as output data at least said content identification data, said receiving party identification data, and said date and time data which has been input by a user; and a first communicating device configured to transmit said outgoing data including said output data supplemented by said transmitting party identification data identifying said user;

wherein said second communication device has:

a second communicating device configured to receive said outgoing data;

a storing device configured to store the received outgoing data; and a controlling device configured to exercise control to verify whether the current date and time coincide with said date and time data stored in said storing device; to retrieve a record including said date and time data from said storing device if said date and time data are found to coincide with said current date and time; and to transmit said content data identified by said content identification data to said receiving party identified by said receiving party identification data within said record; and wherein said third communication device has:

a third communicating device configured to receive said content data from said second communication device; and a reproducing device configured to reproduce the received content data.

4. A communication system according to claim 3, wherein said inputting device outputs the content identification data selected by an operation of said user.

5. A communication system according to claim 4, wherein said storing device in said second communication device stores a plurality of content data items, and page information including a plurality of content identification data items for identifying said plurality of content data items;

wherein said first communication device comprises a displaying device configured to display said page information transmitted from said second communicating device;

wherein said inputting device outputs the content identification data item selected by an operation of said user selecting any one of said content identification data items displayed on said displaying device; and wherein said controlling device in said second communication device exercises control to search said storing device for the content data based on said content identification data transmitted from said first communicating device, and to transmit the retrieved content data to said receiving party.

6. A communication system according to claim 3, wherein said third communicating device transmits reception-complete data to said second communicating device when said content data has all been received, and wherein said second communicating device transmits the received reception-complete data to said first communication device.

7. A communication system according to claim 1, further comprising another communication device configured to transmit advertisement data and sponsor identification data identifying a sponsor of said advertisement data to said second communication device;

wherein said second communication device transmits said advertisement data along with said content data to said third communication device.

8. A communication system according to claim 7, wherein said first communication device has:

an inputting device configured to output as output data at least said content identification data, said receiving party identification data, and said date and time data which has been input by a user; and a first communicating device configured to transmit outgoing data including said output data supplemented by said transmitting party identification data identifying said user;

wherein said another communication device has a transmitting device for transmitting advertisement information constituted by said advertisement data and said sponsor identification data;

wherein said second communication device has:

a second communicating device configured to receive said outgoing data and said advertisement information;

a storing device configured to store the received outgoing data and advertisement information; and a controlling device configured to exercise control to check whether the current date and time coincide with said date and time data stored in said storing device; to retrieve a record including said date and time data from said storing device if said date and time data are found to coincide with the current date and time; to transmit, along with said advertisement data, said content data identified by said content identification data to said receiving party identified by said receiving party identification data within said record; and to transmit charge data corresponding to said sponsor identification data to a charge server; and wherein said third communication device has:

a third communicating device configured to receive said content data and said advertisement data from said second communication device; and a reproducing device configured to reproduce the received content data and advertisement data.

9. A communication system according to claim 8, wherein said third communicating device transmits reception-complete data to said second communicating device when said advertisement data has all been received;

wherein said second communicating device transmits the received reception-complete data to said another communication device; and wherein said controlling device in said second communication device comprises:

a counting device configured to count the number of times said reception-complete data has been received;

a counted result storage controlling device configured to store a count made by said counting device into said storing means in association with said sponsor identification data identifying each of different sponsors; and a charge data generating device configured to generate charge data at predetermined intervals in association with said sponsor identification data identifying each different sponsor in keeping with the counts stored in said storing device regarding said different sponsors.

10. A communication system according to claim 8, wherein said third communication device is a mobile phone, and wherein said controlling device in said second communication device transmits, to a management device, discount data representing a discount corresponding to said advertisement data along with user identification data identifying a user of said mobile phone managed by said management device.

11. A communication system according to claim 1, wherein said third communication device receives and reproduces voice data transmitted from said second communication device.

12. A communication system according to claim 1, wherein said third communication device receives and reproduces music data transmitted from said second communication device.

13. A communication system according to claim 1, wherein said third communication device receives and reproduces advertisement data transmitted from said second communication device.

14. A communication system according to claim 1, wherein said third communication device receives and reproduces at least two out of three kinds of data consisting of voice data, music data, and advertisement data transmitted from said second communication device.

15. A communication device comprising:
a receiving device configured to receive outgoing data including content identification data, transmit party identification data, and receive party identification data, and date and time data from a first communication device;
a storing device configured to store said outgoing data;
a transmitting device configured to transmit digital audio content data identified by the stored content identification data to a second communication device, said digital audio content being compressed; and
a controlling device configured to exercise control to transmit said content data identified by said content identification data to a receiving party identified by said receiving party identification data in the stored outgoing data at a date and time corresponding to said date and time data,
wherein a wireless apparatus associated with the receiving party receives and stores said digital audio content data transmitted by said transmitting device without pushing an off-hook button and decodes said digital audio content data.

16. A communication device according to claim 15, wherein said controlling device exercises control to check whether the current date and time coincide with said date and time data stored in said storing device; to retrieve a record including said date and time data from said storing device if said date and time data are found to coincide with the current date and time; and to transmit said content data identified by said content identification data to said receiving party identified by said receiving party identification data within said record.

17. A communication device according to claim 16, wherein said storing device stores a plurality of content data items, and page information including a plurality of content identification data items for identifying said plurality of content data items; and
wherein said controlling device exercises control to search said storing device for the content data based on said content identification data transmitted from said first communicating device based on said page information, and to transmit the retrieved content data to said receiving party.

18. A communication device according to claim 15, wherein said receiving device receives reception-complete data from said second communication device indicating that said content data has all been received; and
wherein said transmitting device transmits the received reception-complete data to said first communication device.

19. A communication device according to claim 15, wherein said receiving device receives from another communication device advertisement information including advertisement data and sponsor identification data identifying a sponsor of said advertisement data; and
wherein said transmitting device transmits said advertisement information along with said content data to said second communication device.

20. A communication device according to claim 19, wherein said receiving device receives said outgoing data and said advertisement information;
wherein said storing device stores the received outgoing data and advertisement information; and
wherein said controlling device exercises control to check whether the current date and time coincide with said date and time data stored in said storing device; to retrieve a record including said date and time data from said storing device if said date and time data are found to coincide with the current date and time; to transmit, along with said advertisement data, said content data identified by said content identification data to said receiving party identified by said receiving party identification data within said record; and to transmit charge data corresponding to said sponsor identification data to a charge server.

21. A communication device according to claim 20, wherein said receiving device receives reception-complete data from said second communication device indicating that said advertisement data has all been received;
wherein said transmitting device transmits the received reception-complete data to said another communication device; and
wherein said controlling device comprises:
a counting device configured to count the number of time said reception-complete data has been received;
a counted result storage controlling device configured to store a count made by said counting device into said storing device in association with said sponsor identification data identifying each of different sponsors; and
a charge data generating device configured to generate charge data at predetermined intervals in association with said sponsor identification data identifying each different sponsor in keeping with the counts stored in said storing device regarding said different sponsors.

22. A communication device according to claim 20, wherein said second communication device is a mobile phone, and wherein said controlling device transmits to a management device discount data representing a discount corresponding to said advertisement data along with user identification data identifying a user of said mobile phone managed by said management device.

23. A communication device according to claim 15, wherein said controlling device causes said transmitting device to transmit voice data.

24. A communication device according to claim 15, wherein said controlling device causes said transmitting device to transmit music data.

25. A communication device according to claim 15, wherein said controlling device causes said transmitting device to transmit advertisement data.

26. A communication device according to claim 15, wherein said controlling device causes said transmitting device to transmit at least two out of three kinds of data consisting of voice data, music data, and advertisement data.

27. A mobile phone comprising:
 a receiving device configured to receive greeting mail and advertisement data without pushing an off-hook button;
 a storing device configured to store greeting mail and advertisement data without pushing an off-hook button;
 a reproducing device configured to reproduce digital audio data included in the received greeting mail, said digital audio content data being compressed;
 a transmitting device configured to transmit to a server device reception-complete data indicating that said greeting mail and said advertisement data has all been received; and
 a controlling device configured to cause said transmitting device to transmit said reception-complete data to said server device when said greeting mail and said advertisement data has all been received.

28. A mobile phone according to claim 27, wherein said reproducing device reproduces voice data included in said greeting mail received by said receiving device.

29. A mobile phone according to claim 27, wherein said reproducing device reproduces music data included in said greeting mail received by said receiving device.

30. A mobile phone according to claim 27, wherein said reproducing device reproduces at least two out of three kinds of data consisting of voice data, music data, and advertisement data received by said receiving device, said voice data and said music data being included in said greeting mail received by said receiving device.

31. A communication method comprising the steps of:
 causing a first communication device to transmit outgoing data including content identification data, transmitting party identification data, receiving party identification data, and date and time data;
 causing a second communication device to receive said outgoing data and to transmit digital audio content data identified by said content identification data to a receiving party identified by said receiving party identification data at a date and time corresponding to said date and time data, said digital audio data being compressed; and
 causing a third wireless communication device to receive and store said digital audio content data transmitted from said second communication device without pushing an off-hook button and to decode said digital audio content data.

32. A communication method comprising the steps of:
 receiving outgoing data including content identification data, transmitting party identification data, receiving party identification data, and date and time data from a first communication device; and
 exercising control to transmit digital audio content data identified by said content identification data to a receiving party identified by said receiving party identification data at a date and time corresponding to said date and time data, said digital audio data being compressed,
 wherein a wireless apparatus associated with said receiving party receives, stores, and decodes said digital audio content data without pushing an off-hook button.

33. A communication method comprising the steps of:
 transmitting outgoing data including content identification data, transmitting party identification data, receiving party identification data, and date and time data to another communication device; and
 exercising control to transmit said outgoing data, including digital audio content data, to said another communication device in response to an operation of a user, said digital audio data being compressed,
 wherein a wireless apparatus associated with said another communication device receives, stores, and decodes said digital audio content data without pushing an off-hook button.

34. A communication method comprising the steps of:
 receiving greeting mail and advertisement data;
 reproducing the received greeting mail;
 transmitting reception-complete data to a server device when said greeting mail and said advertisement data has all been received; and
 transmitting the reception-complete data as digital audio content data to a receiving party, said digital audio data being compressed,
 wherein a wireless apparatus associated with said receiving party receives, stores, and decodes said digital audio content data without pushing an off-hook button.

35. A storage medium for storing a communication method program, said program comprising the steps of:
 causing a first communication device to transmit outgoing data including content identification data, transmitting party identification data, receiving party identification data, and date and time data;
 causing a second communication device to receive said outgoing data and to transmit digital audio content data identified by said content identification data to a receiving party identified by said receiving party identification data at a date and time corresponding to said date and time data, said digital audio data being compressed; and
 causing a third wireless communication device to receive, store, and decode said digital audio content data transmitted from said second communication device without pushing an off-hook button and to reproduce said digital audio content data.

36. A storage medium for storing a communication method program, said program comprising the steps of:
 receiving outgoing data including content identification data, transmitting party identification data, receiving party identification data, and date and time data from a first communication device; and
 exercising control to transmit digital audio content data identified by said content identification data to a receiving party identified by said receiving party identification data of said outgoing data at a date and time corresponding to said date and time data, said digital audio data being compressed,
 wherein a wireless apparatus associated with said receiving party receives, stores, and decodes said digital audio content data without pushing an off-hook button.

37. A storage medium for storing a communication method program, said program comprising the steps of:
 transmitting outgoing data including content identification data, transmitting party identification data, receiving party identification data, and date and time data to another communication device; and exercising control to transmit said outgoing data, including digital audio content data, to said another communication device in response to an operation of a user, said digital audio data being compressed, wherein a wireless apparatus associated with said another communication device receives, stores, and decodes said digital audio content data without pushing an off-hook button.

38. A storage medium for storing a communication method program, said program comprising the steps of:

receiving greeting mail and advertisement data;

reproducing the received greeting mail;

exercising control to transmit reception-complete data to a server device when said greeting mail and said advertisement data has all been received; and transmitting the reception-complete data as digital audio content data to a receiving party, said digital audio data being compressed, wherein a wireless apparatus associated with said receiving party receives, stores, and decodes said digital audio content data without pushing an off-hook button.

* * * * *